Inventors
MICHEL L. AVIGNON
JOSEPH L. MADER
By Alfred C. Hill
Agent

Inventors
MICHEL L. AVIGNON
JOSEPH L. MADER
By Alfred C. Hill
Agent

Inventors
MICHEL L. AVIGNON
JOSEPH L. MADER
By Alfred C. Hill
Agent

United States Patent Office 3,560,960

Patented Feb. 2, 1971

3,560,960

NONLINEAR TERNARY DECODER

Michel L. Avignon, Neuilly-sur-Seine, France, and Joseph L. Mader, Dietlikon, Switzerland, assignors to International Standard Electric Corporation, New York, N.Y., a corporation of Delaware Filed Dec. 22, 1967, Ser. No. 692,929

Claims priority, application France, Dec. 29, 1966, 89,324

Int. Cl. H03k *13/02*

U.S. Cl. 340—347 10 Claims

ABSTRACT OF THE DISCLOSURE

The nonlinear characteristic of the decoder is approximated by a plurality of differently sloped straight line segments and each ternary condition is represented by a different pair of binary digits. A first signal, produced by the most significant ternary digits of a code group, indicates the minimum voltage of the segment containing the code group. A second signal, produced in response to at least the least significant digits of the code group, indicates the position of the code group along said segments. A weighting and summing circuit responds to these two signals to produce the decoder output.

BACKGROUND OF THE INVENTION

This invention relates to a digital decoder and more particularly to a nonlinear ternary decoder for translating a ternary code number or code group into an analog quantity represented by the code group.

In the ternary number base system, a digit of a given rank can have one of the conditions 0, 1 and 2 which are represented in coded form by means of two binary bits. Thus, in one well known form of ternary code, referred to as "code A" these three ternary conditions or values are respectively represented by the pair of binary bits 01, 00, and 10.

Nonlinear decoders for binary codes using a resistor network and permitting the achievement of a hyperbolic nonlinear characteristic is known in the art. These resistors, the extreme values of which are in the $2^n$ ratio, must be switched according to the value of the number to be decoded. However, it is known that every resistor has a given reactance that is related to its value. If the switching frequency is high, the effect of this reactance becomes important and the value of corresponding complex impedance depends on the number to be decoded. It is, therefore, understood that a decoder comprising resistors the values of which are so dissimilar is quite difficult to realize and cannot have great precision.

Moreover, when an electronic switch is used to sample the signal to be coded, the switch presents, when it is on, a serial resistance (saturation resistance in the case of a transistor), that is not negligible with regard to the network resistances of low value and that introduces a new source of errors.

To overcome the difficulty in obtaining a continuous nonlinear characteristic there has been described in U.S. Pat. No. 3,298,017 a binary number decoder so designed that its characteristic curve comprises a succession of straight segments with different slopes, these slopes being chosen, for example, so that the characteristic approximates a logarithmic curve.

The operation of this decoder is as follows, assuming that the number of codes which are applied to it comprise $n=7$ digits and that the voltages corresponding to codes 0 and $2^n-1$ are respectively equal to 0 and $Ed$ volts, the codes $2^{n-1}-1$ and $2^{n-1}$ being situated on both sides of the voltage $Ed/2$ which characterizes the average value of the signal in the case when the codes represent periodic voltages. Each of these voltage ranges of $Ed/2$ amplitude is divided into three coding zones C1, C2, C3, to which correspond respectively thirty-two, sixteen and sixteen codes and in which the values of the quantizing steps are different. Thus, in the C1 zone, which corresponds to the lowest voltages in absolute value on both sides of the origin, the value of this quantizing step is equal to V. In the C2 zone, the quantizing step is equal to 8V volts and in the C3 zone, the quantizing step is equal to 64V volts. The characteristic curve so determined comprises six segments, the slopes of which are proportional to the different values of the quantizing steps.

To obtain the analog voltage corresponding to a given binary code number, the zone to which this code number belongs is first determined by the three most significant digits since each zone comprises a number of codes equal to an integer power of two. The zone signal thus obtained is used on one hand to generate a base or pedestal voltage equal to the voltage that corresponds to minimum code of the zone and on the other hand to generate a position voltage representing the position of the code in the zone to which it belongs. This latter voltage is obtained by decoding in a linear manner the least significant digit with a weighting corresponding to the value of the quantizing step in this zone. These two voltages are then added together to obtain the analog voltage represented by the code.

SUMMARY OF THE INVENTION

An object of the present invention is to provide a nonlinear decoder for ternary numbers represented by two binary digits per ternary rank or digit.

The decoder of the present invention operates in a manner similar to the binary decoder described hereinabove under the section entitled "Background of the Invention." In the ternary decoder of the present invention the decoded voltage is obtained by the addition of a pedestal voltage to a position voltage. The number of codes and also the slopes and the different zones or straight line segments representing the nonlinear characteristic are equal to an integer power of three.

It will be noticed that, in the coding of speech signals, the ternary code employed presents some advantages relative to the transmission of its binary digits. As a matter of fact, if ternary condition 1 is represented alternatively by the binary bits 00 and 11, there is obtained on an average equal numbers of 0 and 1 for transmission, which is a very favorable condition to provide synchronization of the receiving equipments.

In accordance with the present invention the nonlinear decoder for ternary numbers can be used either as an expansion-decoder, or as a decoder associated with a compressor-coder circuit, the coding being carried out according to the well known process of "feedback-comparison" coding, such as described, for example, in the book "Notes on Analog-Digital Conversion" by A. K. Susskin (MIT publication) pp. 5.54 to 5.60.

A feature of the present invention is the provision of a ternary decoder having a nonlinear characteristic approximated by plurality interconnected straight line segments each having different slopes comprising: a ternary code group source, said group having $n$ ternary digits, where $n$ is equal to an integer greater than one; first means coupled to the source responsive to the $m$ most significant ternary digits of the code group to produce a first signal indicative of the minimum voltage of one of the straight line segments within which the code group is located, where $m$ is equal to an integer less than $n$; second means coupled to the source responsive to at least the $(n-m)$ least significant ternary digits of the code group to produce a second signal indicative of the position of the code group along the one of the segments; and third means coupled to the first and second means responsive to the first and second signals to produce an analog signal represented by the code group.

The ternary numbers to be decoded comprise $2n$ binary bits to represent numbers with $n$ ternary digits. In accordance with the present invention the decoder delivers voltages having an average value $Ed/2$, *where* Ed is the decoded voltage corresponding to the ternary number $3^n-1$. The decoder characteristic curve is symmetrical with respect to the point af the abscissa $Ed/2$, and it comprises nine segments, each segment covering twenty-seven consecutive numbers, with the slopes of the two consecutive segments being in a ratio of three. The three segments centered on both sides of the voltage $Ed/2$ define three coding zones in which the quantizing step has a value of V, and the other zones, on both sides of the central zones, respectively, have 3V, 9V, and 27V volts as a value of the quantizing step. The analog voltage corresponding to a given code is obtained by carrying out the following operations: (a) determination of a zone to which the code belongs by examining the four binary digits corresponding to the two most significant digits of the ternary number: (b) generation of a pedestal voltage characterizing the amplitude of the analog voltage corresponding to the first code of the zone or straight line segment in which the ternary number is located; (c) determination of the position of the ternary number in its zone or straight line segment by examining the digits that have not been used to determine the zone or straight line segment within which the code of number is located, these digits representing the difference number between the considered code and the maximum code of the immediately lower zone or straight line segments; (d) generation of a position voltage representing the decoded value of the difference number by using the quantizing step value assigned to the zone to which the number belongs; and (e) addition of the pedestal and position voltages.

Another feature of the present invention is the provision of an arrangement for adding the pedestal and position voltages (the first and second signals) including connecting simultaneously one or more current generators at different injection points of the ladder attenuator having an insertion loss of three per cell, the injection point being chosen according to the zone to which the ternary number or code group belongs.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENT

Figure 1A:
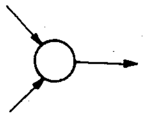
FIGS. 1*a* to 1*d* illustrate symbols employed in the circuit of FIG. 3.
Figure 1B:
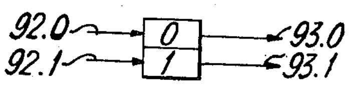
Figure 1C:
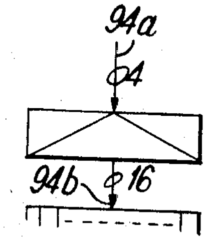
Figure 1D:
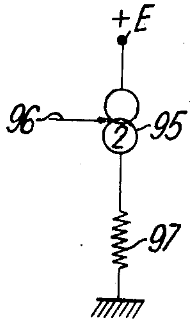

Before describing the invention, the logical algebra notations will be discussed that are employed herein in order to simplify the description of the logical operations. The subject is treated extensively in numerous papers and in particular in the book "Logical Design of Digital Computers" by M. Phister (J. Wiley publisher).

Thus, if a condition characterized by the presence of a signal is written A, the condition characterized by the absence of said signal will be written $\overline{A}$.

These two conditions are linked by the well known logical relation $A\times\overline{A}=0$, in which the sign "$\times$" is the symbol of the coincidence logical function or AND function.

If a conditioner C appears only if the condition A and B are simultaneosuly present, the logical function is written $A\times B=C$ and this function may be carried out by means of a coincidence or AND gate.

If a conditioner C appears when at least one of two conditions E and F is present, the logical function is written $E+F=C$ and this function is carried out by means of a mixing gate or OR gate.

If one characterizes the condition A by the digit 1 and the condition $\overline{A}$ by the digit 0, the condition B by the digit 1 and the condition $\overline{B}$ by the digit 0, the combination $A\times B$ may be written 11, the combination $\overline{A}\times B$ may be written 01, etc. . . .

Referring to FIG. 1, the meaning of some symbols used in FIG. 3 will be described. FIG. 1*a* represents a simple AND gate. FIG. 1*b* represents a bistable circuit or "flip-flop" to which a control signal is applied over one of its input terminals 92–1 or 92–0 in order to set it in the 1 state or to reset it in the 0 state. A voltage of same polarity as that of the control signal is present, either on the output 93–1 when the flip-flop is in the 1 state, or on the output 93–0 when it is in the 0 state. If the flip-flop is referenced B1, the logical condition which characterizes the fact that it is in the 1 state will be written B1 and that characterizing the fact that it is in the 0 state will be written $\overline{B1}$. FIG. 1*c* represents a decoder which, in the case of the example, transforms a four-bit binary code group applied over the group of conductors **94*a* into a 1 out of 16 codes, so that a signal appears on only one among the sixteen conductors 94*b*** for each one of the code groups applied at the input. FIG. 1*d* represents a current generator 95 controlled by a signal applied to its input terminal 96 and which is loaded by the resistor 97. If I designates the unit current, generator 95 delivers a current 2I which is symbolized by the digit "2" placed inside the lower circle of the symbol.

At last, in a ternary number, a "digit of rank 1" is considered the most significant digit of the number, a "digit of rank 2" is considered the next less significant digit, etc. . . . Similarly, when the ternary number is binary coded with two bits per ternary rank the two most significant bits will be called "pair of bits of rank 1," etc.

Figure 2:
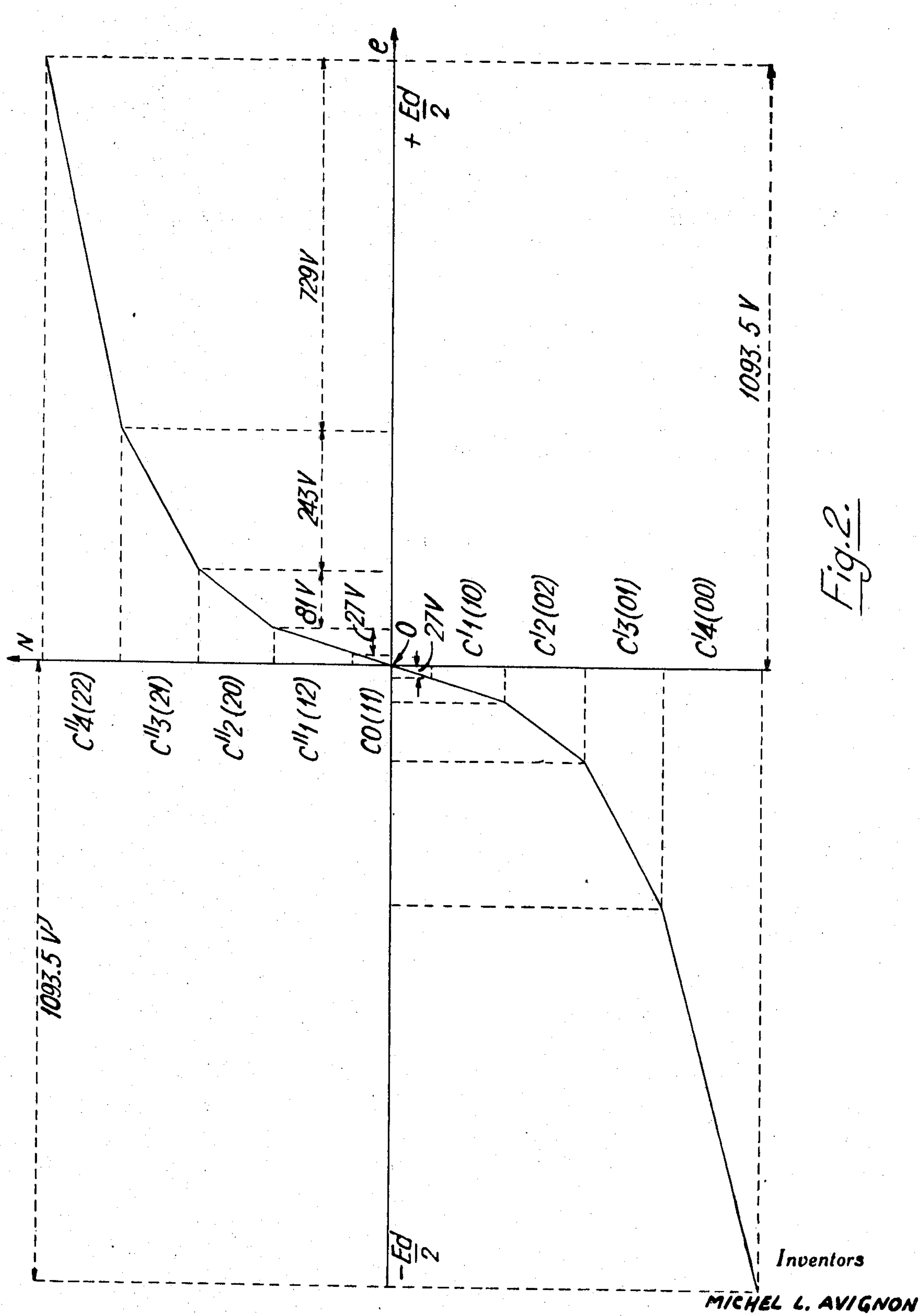
FIG. 2 illustrates the characteristic curve of the decoder according to the principles of the present invention.

FIG. 2 illustrates the characteristic curve $e=f(N)$ of the decoder according to the invention to which are applied ternary numbers N comprising at least two digits and which delivers voltages the average value of which, in the case of sine wave voltages, is equal to $Ed/2$, and the peak amplitude of which is equal to $$\frac{Ed}{2}\pm\frac{Ed}{2}$$

By way of a non-limiting example, a decoder will be described for ternary numbers with $n$-five digits ($3^5=243$ different code groups) comprising nine coding zones or interconnected straight line segments and four slopes of different values, each zone including twenty-seven ternary numbers.

There is represented, on the ordinate axis, the references of these nine zones and, between brackets, the two most significant ternary digits that characterize each one of these zones. The abscissae axis represents the range of decoded voltages corresponding to these various zones expressed in quantizing units of amplitude V. It will be noticed that, as a consequence of the utilization of a ternary code, the zone *Co* is centered on both sides of the coordinate origin 0.

The characteristic curve of this decoder presents a multilinear shape, as it is constituted by a succession of straight line segments of different slopes.

The table I groups all the informations relative to the different codes and to the decoding characteristic of the circuit according to the invention.

The columns 1 and 2 show the decimal numbers from 0 to 8 and their equivalents in the ternary number base, the values 0, 1 and 2 being assigned to the three ternary digits. The column 3 indicates the corresponding value of the pairs of binary bits B1*a*–B1*b* (rank 1) and B2*a*–B2*b* (rank 2).

The column 4 indicates the references of the zones defined by the decoding of the corresponding binary bits of column 3. The column 5 indicates the slope of the characteristics (in volts by code) in each one of these zones. The column 6 indicates the number of quantizing unit steps V (in short: EQ) in each zone. The column 7 indicates the fraction of E*d* voltage range occupied by each one of the nine zones.

in register RG. This circuit comprises a ladder attenuator fed by current generators, the mode of operation of which is described in the U.S. Pat. No. 3,298,017. These generators are controlled selectively by means of the signals delivered by circuits PC and LD.

As a ternary code is used, each cell of the attenuator must bring an attenuation $\alpha$ that is an integer power of three. In this decoder $\alpha=3^1=3$ which is obtained by taking the following values for the resistors: extreme shunt resistors=R; other shunt resistors=$3R/2$ and series resistors =2R. The characteristic impedance of the attenuator is then equal to $3R/4$.

It results that, if a current $i$ is injected at point Q*o*, a voltage $Vx=3Ri/4$ appears between point X and the ground and that, if the injection point is shifted towards the left, the voltage V*x* decreases each time in a ratio of three. It is thus seen that this attentuation ratio is a negative power of three, the exponent of which is given by the digit of the reference of the injection point. Thus, a current injected at point Q2 produces a voltage attenuated in a ratio $3^{-2}=1/9$ with respect to the same current injected at point Q*o*.

Moreover, if at a given point currents are injected delivered by two generators having a high internal resistance with respect to the characteristic impedance, there is addition of the currents and the output voltages double.

We will first study, in relation with FIG. 2, the process used for the determination of the pedestal voltages, the number stored in the flip flops of register RG (FIG. 3) being expressed in column 3, Table I.

TABLE I

| 1 | 2 | 3 | | | | 4 | 5 | 6 | 7 |
|---|---|---|---|---|---|---|---|---|---|
| | | Code A | | | | | | Number of EQ | |
| Decimal Number | Ternary Number | B1*a* | B1*b* | B2*a* | B2*b* | Zones | Slope | in the zone | Fraction of Ed |
| 0 | 0 0 | 0 | 1 | 0 | 1 | C′4 | 27V | 729 | 1/3 |
| 1 | 0 1 | 0 | 1 | 0 | 0 | C′3 | 9V | 243 | 1/9 |
| 2 | 0 2 | 0 | 1 | 1 | 0 | C′2 | 3V | 81 | 1/27 |
| 3 | 1 0 | 0 | 0 | 0 | 1 | C′1 | V | 27 | 1/81 |
| 4 | 1 1 | 0 | 0 | 0 | 0 | Co | V | 27 | 1/81 |
| 5 | 1 2 | 0 | 0 | 1 | 0 | C″1 | V | 27 | 1/81 |
| 6 | 2 0 | 1 | 0 | 0 | 1 | C″2 | 3V | 81 | 1/27 |
| 7 | 2 1 | 1 | 0 | 0 | 0 | C″3 | 9V | 243 | 1/9 |
| 8 | 2 2 | 1 | 0 | 1 | 0 | C″4 | 27V | 729 | 1/3 |

NOTE.—Total number of quantizing steps: 2187.

Figure 3:
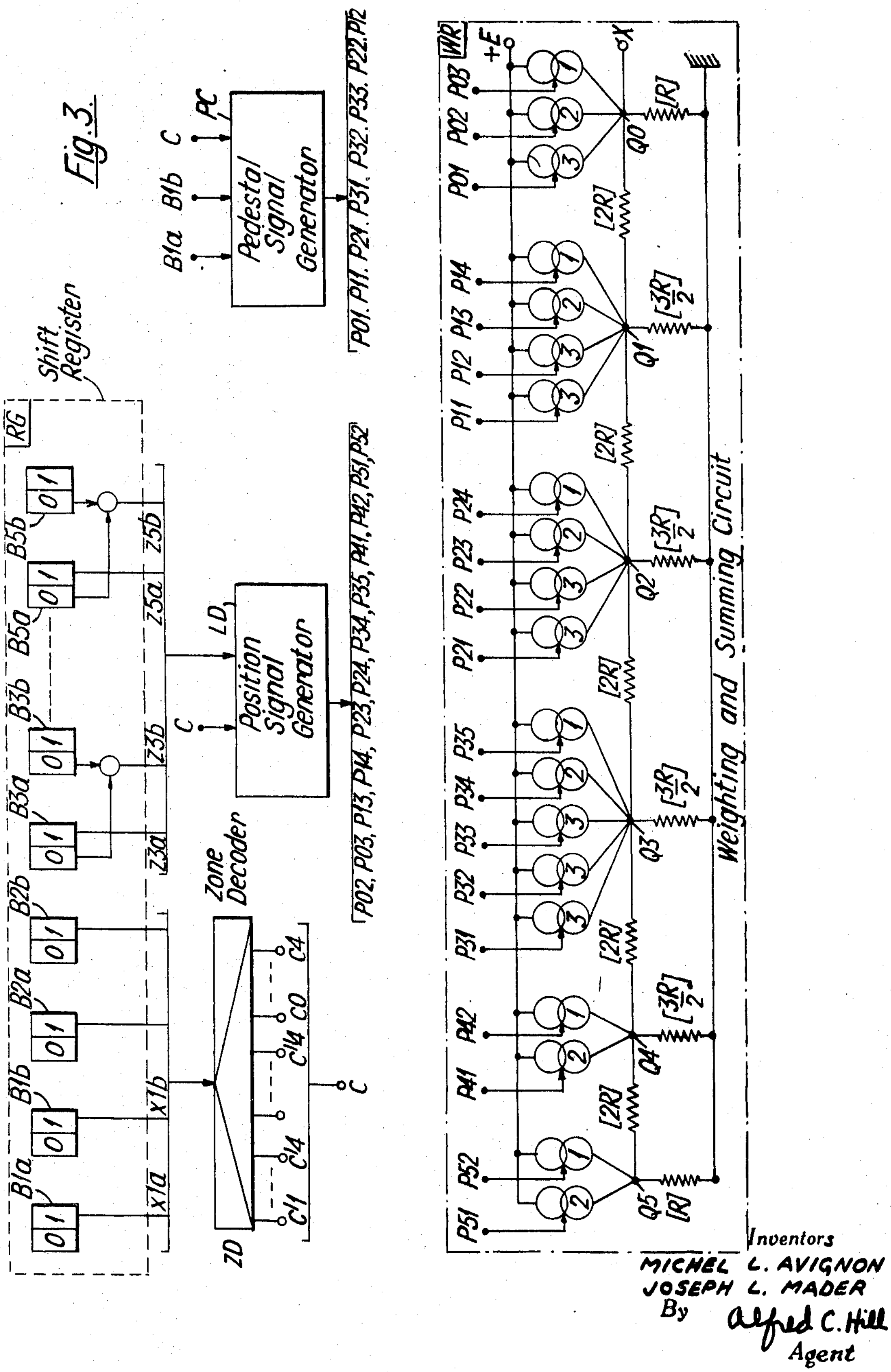
FIG. 3 is a block diagram of the decoder in accordance with the principles of the invention.

FIG. 3 illustrates the block diagram of the decoder according to the present invention which comprises shift register RG, zone decoder ZD, pedestal (first signal) signal generator PC, position (second signal) signal generator LD, and weighting and summing circuit WR.

Register RG comprises flip flop B1*a*, B1*b* . . . B5$\alpha$, B5*b* for the storage of the ten binary bits representing a 5-digit ternary code.

Zone decoder ZD is coupled to the outputs 0 and 1 of the flip-flops of ternary rank 1 and 2 (the *m* most significant ternary digits) and delivers the zone signals C′1 to C′4, C″1 to C″4, C*o* to C4; all of these signals being available on the groups of conductors C.

It will be noticed that in logical notation:

$$C1=C'1+C''1,\ C2=C'2+C''2, \text{ etc. . . .}$$

Pedestal signal generator PC delivers a pedestal signal characterizing the lower decoded voltage of the coding zone to which the code stored in register RG belongs.

Position signal generator LD delivers a position voltage control signal that is function on one hand of the coding zone, and on the other hand of the value of the number constituted by the digits of ternary rank 3, 4 and 5(($n-m$) least significant ternary digits) stored in register RG.

Weighting and summing circuit WR delivers on its output X a voltage characterizing the value of the code stored The decoded voltages corresponding to the twenty-seven codes of the zone C′4 are disposed between zero volts for the code, the decimal equivalent of which is zero, and $729V-27V=702V$ for the code, the decimal equivalent of which is $3^3-1=26$. These decoded voltages are position voltages generated, as will be seen further on, under the control of the signals delivered by circuit LD.

For the immediately higher code, the decimal equivalent of which is $3^3=27$, belongs—as well as the twenty-six following codes—to zone C′3. Therefore, the position voltage is replaced by a pedestal voltage $Ua=729V$ that is equal to the position voltage characterizing the number 26 plus a quantizing step of the zone C′4, which makes $27V$. For the following codes of the zone C′3 there is added to this voltage U*a*, position voltages having an amplitude proportional to the position of the code in this zone and to the value of the quantizing step.

This pedestal voltage is kept for all the zones corresponding to higher numbers and, every time the zone changes, a new pedestal voltage U*b*, U*c* . . . U*h* is added which corresponds to the amplitude of the voltage covered by the preceding zone.

Table II represents the different pedestal voltages used. It comprises the lines 1, 2, 3 and columns *c* indicating the value—in quantizing unit steps—of each pedestal voltage, the reference characters U*a* to U*h* of these voltages and the reference characters of the pedestal control signals P*o*1 to *P*12 generated by circuit P*c*.

TABLE II

| | | | | | | | | | | | | | |
|---|---|---|---|---|---|---|---|---|---|---|---|---|---|
| 1 | Weight ⟶ | | | | | 729 | 243 | 81 | 27 | 27 | 27 | 81 | 243 |
| 2 | Zone | Code A ↓ | | | | Ua | Ub | Uc | Ud | Ue | Uf | Ug | Uh |
| 3 | | B1a | B1b | B2a | B2b | Pol | P11 | P21 | P31 | P32 | P33 | P22 | P12 |
| | C'4 | 0 | 1 | 0 | 1 | | | | | | | | |
| | C'3 | 0 | 1 | 0 | 0 | x | | | | | | | |
| | C'2 | 0 | 1 | 1 | 0 | x | x | | | | | | |
| | C'1 | 0 | 0 | 0 | 1 | x | x | x | | | | | |
| | Co | 0 | 0 | 0 | 0 | x | x | x | x | | | | |
| | C"1 | 0 | 0 | 1 | 0 | x | x | x | x | x | | | |
| | C"2 | 1 | 0 | 0 | 1 | x | x | x | x | x | x | | |
| | C"3 | 1 | 0 | 0 | 0 | x | x | x | x | x | x | x | |
| | C"4 | 1 | 0 | 1 | 0 | x | x | x | x | x | x | x | x |
| | a | | b | | | | | | | c | | | |

Table II also comprises columns *a* and *b*, respectively, indicating the nine coding zones and the four most significant binary bits which characterize said zone.

The pedestal control signals generated for a given zone are indicated by the crosses aligned on the corresponding line. Thus, for the zone C*o*, the signals P*o*1, P11, P21 and P31 are simultaneously present.

The conditions for generation of these signals are immediately deduced from the Table II and are grouped in Table III which indicates all the logical conditions in circuit PC (FIG. 3).

It will be noticed that the two digits of the reference characters of these pedestal signals characterize by the first digit the number of the injection point of the current in the ladder attenuator (circuit WR, FIG. 3) and by the second digit a serial number distinguishing the signals that control different current generators connected to the same injection point.

TABLE III

| Signal: | Logical condition |
|---|---|
| P*o*1 | C'3+C'2+$\overline{B1b}$ |
| P11 | C'2+$\overline{B1b}$ |
| P21 | $\overline{P1b}$ |
| P31 | C*o*+C" |
| P32 | C" |
| P33 | B1*a* |
| P22 | C"3+C"4 |
| P12 | C"4 |
| C" | C"1+C"2+C"3+C"4 |

Moreover, in order to simplify FIG. 3, the current generators have not been designed by particular reference characters and, later on, they will be identified by the reference characters of their control signals.

Now let us consider the mode of generation of the position voltage that characterized the position of a code in its zone, this voltage being added up, in the ladder attenuator, to the pedestal voltage.

It will be first assumed that, the ternary conditions 0, 1 and 2 correspond, respectively, to currents O, I and 2I.

Thus, the decoding of the ternary digits of rank 3, 4 and 5 corresponding to the twenty-seven codes of a zone gives the values of current mentioined in Table IV. It should be noted that the codes belonging to a given zone have the same digit of rank 2 and that their three last digits constitute one of the ternary numbers disposed between 000 and 222.

If it is assumed that these codes belong to the zone C'4 (FIG. 2) and using the highest quantizing step value, the current corresponding to the digit of tenary rnak 3 will be injected at point Q*o*, and those corresponding to the digits of rank 4 and 5 will be, respectively, injected at points Q1 and Q2. For the code 0222, the voltage at output X will be proportional to $$i'=2I+\frac{2I}{3}+\frac{2I}{9}$$

and, for the immediately higher code, it must be proportional to $$i'+\frac{I}{9}=3I$$

since $I/9$ represents the current quantum for this zone.

TABLE IV

| Ternary Number | | | | Injected |
|---|---|---|---|---|
| Rank (2) | 3 | 4 | 5 | |
| Weight (27) | 9 | 3 | 1 | Current |
| (0) | 0 | 0 | 0 | 0 |
| (0) | 0 | 0 | 1 | I |
| (0) | 0 | 0 | 2 | 2 I |
| (0) | 0 | 1 | 0 | 3 I |
| | . | | | . |
| | . | | | . |
| | . | | | . |
| (0) | 1 | 0 | 0 | 9 I |
| | . | | | . |
| | . | | | . |
| | . | | | . |
| (0) | 2 | 2 | 1 | 25 I |
| (0) | 2 | 2 | 2 | 26 I |
| (1) | 0 | 0 | 0 | 27 I |

The generator delivering the pedestal voltage U*a* (see Table II) must, therefore, deliver a current of amplitude 3I that is injected at point Q*o*. All the other pedestal currents have the same value and are injected at the points defined by the first digit of the reference character of each current generator (Table II, line 3 and Table III).

Since the value of the quantizing step varies in a ratio three between two adjacent zones, the injection points of the position current generators are shifted by one unit when passing from one zone to the adjacent zone, except for the zones C1 and Co which have the same quantizing step value—as it can be seen on Table V.

In this table, each rectangle indicated the pairs of current generators used in the production of the position voltage for the different zones, the corresponding control signals being delivered by circuit LD (FIG. 3). It will be noticed that, for each ternary rank, there must be two current generators for the decoding of the pair of binary bits that represents it.

TABLE V

| Injection Point → | | Qo | Q1 | Q2 | Q3 | Q4 | Q5 |
|---|---|---|---|---|---|---|---|
| Relative Weights → | | $3^0 = 1$ | $3^{-1}$ | $3^{-2}$ | $3^{-3}$ | $3^{-4}$ | $3^{-5}$ |
| Zones: | C4 | Po2/Po3 | P13/P14 | P23/P24 | | | |
| | C3 | | P13/P14 | P23/P24 | P34/P35 | | |
| | C2 | | | P23/P24 | P34/P35 | P41/P42 | |
| | C1<br>Co | | | | P34/P35 | P41/P42 | P51/P52 |

Circuit LD receives on one hand the zone signals C and on the other hand signals characterizing the condition of the digits of ranks 3, 4 and 5 as delivered by register RG.

The binary informations stored in the flip flops B3*a* to B5*b* are not directly used for the generation of the position signals. Thus, consider, for example, flip flops B3*a* and B3*b*, it is seen: for the pair of binary bits 01 (ternary digit condition (0), the logical condition $\overline{z3a}\times\overline{z3b}$ is obtained; for the pair of binary bits 00 (ternary digit condition 1), the logical condition $\overline{z3a}\times\overline{z3b}$ is obtained; and for the pair of binary bits 10 (ternary) digit condition 2), the logical condition $z3a\times z3b$ is obtained.

It results that, if the signals $z3b$ and $z3a$ are applied to the control input of two current generators connected to the same injection point and supplying, respectively, current of value I and 2I, there will be obtained currents proportional to the coded ternary digit.

TABLE VI

| Signal: | Logical Condition |
|---|---|
| Po2 | $C4\times z3a$ |
| Po3 | $C4\times z3b$ |
| P13 | $C4\times z4a+C3\times z3a$ |
| P14 | $C4\times z4b+C3\times z3b$ |
| P23 | $C4\times z5a+C3\times z4a+C2\times z3a$ |
| P24 | $C4\times z5b+C3\times z4b+C2\times z3b$ |
| P34 | $C3\times z5a+C2\times z4a+(Co+C1)\times z3a$ |
| P35 | $C3\times z5b+C2\times z4b+(Co+C1)\times z3b$ |
| P41 | $C2\times z5a+(Co+C1)\times z4a$ |
| P42 | $C2\times z5b+(Co+C1)\times z4a$ |
| P51 | $(Co+C1)\times z5a$ |
| P52 | $(Co+C1)\times z5b$ |

Table VI indicates the logical conditions for generation, in circuit LD, of the position voltage control signals corresponding to the shifting shown in the Table V.

While we have described above the principles of our invention in connection with specific apparatus, it is to be clearly understood that this description is mode only by way of example and not as a limitation to the scope of our invention as set forth in the objects thereof and in the accompanying claims.

We claim:

1. A ternary decoder having a nonlinear characteristic approximated by a plurality of interconnected straight line segments each having different slopes comprising:
   - a ternary code group source, said group having *n* ternary digits, where *n* is equal to an integer greater than one;
   - first means coupled to said source responsive to the ternary condition of each of the *m* most significant ternary digits of said code group to produce a first signal indicative of the minimum voltage of one of said segments within which said code group is located, where *m* is equal to an integer less than *n*;
   - second means coupled to said source responsive to the ternary condition of each of the (*n*—*m*) least significant ternary digits of said code group to produce a second signal indicative of the position of said code group along said one of said segments; and
   - third means coupled to said first and second means responsive to said first and second signals to produce an analog signal represented by said code group.

2. A decoder according to claim 1, wherein:
   said third means includes:
   - a weighting and summing circuit.

3. A decoder according to claim 2, wherein:
   said weighting and summing circuit includes:
   - a weighted ladder attenuator having a plurality of input points and an output, and
   - a plurality of differently weighted current generators coupled to each of said input points and at least one of said first and second means, appropriate ones of said current generators being activated by at least one of said first and second signals to produce at said output said analog signal.

4. A decoder according to claim 1, wherein:
   said first means includes:
   - fourth means coupled to said source responsive to the ternary condition of said most significant ternary digits to produce a third signal identifying said one of said segments, and
   - fifth means coupled to said source and said fourth means responsive to the ternary condition of the most significant ternary digit and said third signal to produce said first signal.

5. A decoder according to claim 4, wherein:
   said second means includes:
   - sixth means coupled to said source and said fourth means responsive to the ternary condition of said least significant ternary digits and said third signal to produce said second signal.

6. A decoder according to claim 5, wherein:
   said third means includes:
   - a weighted ladder attenuator having a plurality of input points and an output, and
   - a plurality of differently weighted current generators coupled to each of said input points and at least one of said fifth and sixth means, appropriate ones of said current generators being activated by at least one of said first and second signals to produce at said output said analog signal.

7. A decoder according to claim 1, wherein:
each ternary condition of each of said ternary digits is represented by a different pair of binary digits; and
said source includes:
a shift register having *n* pairs of binary devices, each of said pairs of binary devices storing said pair of binary digits representing the ternary condition of one of said ternary digits.

8. A decoder according to claim 7, wherein:
said first means includes:
fourth means coupled to *m* pairs of said binary devices representing the ternary conditions of said *m* most significant ternary digits to produce a third signal identifying said one of said segments, and
fifth means coupled to said fourth means and said pair of binary devices representing the ternary condition of the most significant ternary digit to produce said first signal.

9. A decoder according to claim 8, wherein:
said second means includes:

sixth means coupled to said fourth means and $(n-m)$ pairs of said binary devices representing the ternary conditions of said $(n-m)$ least significant ternary digits to produce said second signal,

10. A decoder according to claim 9, wherein:
said third means includes:
a weighted ladder attenuator having a plurality of input points and an output, and
a plurality of differently weighted current generators coupled to each of said input points and at least one of said fifth and sixth means, appropriate ones of said current generators being activated by at least one of said first and second signals to produce at said output said analog signal.

References Cited

UNITED STATES PATENTS

| | | | |
|---|---|---|---|
| 3,290,671 | 12/1966 | Lamoureux | 340—347 |
| 3,382,438 | 5/1968 | Geller | 340—347 |
| 3,305,857 | 2/1967 | Barber | 340—347 |
| 3,298,017 | 1/1967 | Avignon | 340—347 |

MAYNARD R. WILBUR, Primary Examiner

J. GLASSMAN, Assistant Examiner